(12) United States Patent
Viljamaa et al.

(10) Patent No.: US 10,862,810 B2
(45) Date of Patent: Dec. 8, 2020

(54) THROUGHPUT IN COMMUNICATIONS NETWORK

(71) Applicant: Nokia Solutions and Networks Oy, Espoo (FI)

(72) Inventors: Janne Petteri Viljamaa, Vantaa (FI); Jesse Christian Kruus, Vantaa (FI); Hannu Pekka Matias Vaitovirta, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 69 days.

(21) Appl. No.: 16/339,908

(22) PCT Filed: Oct. 10, 2016

(86) PCT No.: PCT/EP2016/074175
§ 371 (c)(1),
(2) Date: Apr. 5, 2019

(87) PCT Pub. No.: WO2018/068810
PCT Pub. Date: Apr. 19, 2018

(65) Prior Publication Data
US 2020/0053013 A1    Feb. 13, 2020

(51) Int. Cl.
*H04L 12/833* (2013.01)
*H04L 12/801* (2013.01)
(Continued)

(52) U.S. Cl.
CPC .......... *H04L 47/2458* (2013.01); *H04L 47/14* (2013.01); *H04L 47/2441* (2013.01); *H04W 28/0231* (2013.01); *H04L 47/193* (2013.01)

(58) Field of Classification Search
CPC . H04L 47/2458; H04L 47/14; H04L 47/2441; H04L 47/193; H04W 28/0231; H04W 72/085
See application file for complete search history.

(56) References Cited

U.S. PATENT DOCUMENTS 8,966,598 B2 *   2/2015   Brink ............... H04L 63/10
                                                    726/6
9,407,870 B2 *   8/2016   Brink ............... H04L 63/065
(Continued)

FOREIGN PATENT DOCUMENTS

WO    WO 2015/188875 A1    12/2015

*Primary Examiner* — Brian T O'Connor
(74) *Attorney, Agent, or Firm* — Harrington & Smith

(57) ABSTRACT

Methods, apparatuses, and computer programs for increasing the efficiency of throughput in a communications network are disclosed. To maintain link throughput even when packet loss is detected, deep packet inspection data is used for determining whether to temporary elevate scheduling priority of a stream, and if the decision is to elevate, the scheduling priority of the stream is elevated temporarily. Thus, an example method includes detecting at an intermediate network node an incoming packet; determining deep packet inspection data from the packet; using the deep packet inspection data to determine whether to temporary elevate scheduling priority of the stream the packet belongs to; and causing, in response to determining to elevate scheduling priority of the stream, a temporary elevation of the scheduling priority of the stream.

20 Claims, 5 Drawing Sheets

(51) Int. Cl.
*H04L 12/851* (2013.01)
*H04W 28/02* (2009.01)

(56) References Cited

U.S. PATENT DOCUMENTS

| | | | | |
|---|---|---|---|---|
| 10,212,093 | B2* | 2/2019 | Yu | H04W 28/0268 |
| 10,243,860 | B2* | 3/2019 | Szilagyi | H04L 41/0853 |
| 10,439,943 | B2* | 10/2019 | Szilagyi | H04L 47/24 |
| 10,574,742 | B2* | 2/2020 | Williams | H04L 1/0009 |
| 2010/0322069 | A1* | 12/2010 | Song | H04W 28/24 |
| | | | | 370/229 |
| 2013/0124682 | A1* | 5/2013 | Williams | G06F 11/004 |
| | | | | 709/217 |
| 2014/0250218 | A1* | 9/2014 | Gochi Garcia | H04L 47/20 |
| | | | | 709/223 |
| 2015/0052601 | A1* | 2/2015 | White | H04L 63/1416 |
| | | | | 726/13 |
| 2015/0189540 | A1* | 7/2015 | Jung | H04L 47/2458 |
| | | | | 370/230 |
| 2016/0183281 | A1* | 6/2016 | Yeh | H04W 28/24 |
| | | | | 370/332 |
| 2016/0234099 | A1 | 8/2016 | Jiao | |
| 2016/0255009 | A1 | 9/2016 | Ramaiah et al. | |
| 2017/0054823 | A1* | 2/2017 | Li | H04L 12/1489 |
| 2017/0126564 | A1* | 5/2017 | Mayya | H04L 63/0281 |
| 2017/0289046 | A1* | 10/2017 | Faccin | H04L 47/2433 |

* cited by examiner

THROUGHPUT IN COMMUNICATIONS NETWORK

CROSS REFERENCE TO RELATED APPLICATION

This patent application is a U.S. National Stage application of International Patent Application Number PCT/EP2016/074175 filed Oct. 10, 2016, which is hereby incorporated by reference in its entirety.

TECHNICAL FIELD

The invention relates to packet switching based communications.

BACKGROUND

In recent years the phenomenal growth of mobile services and proliferation of smart phones and tablets have increased a demand for higher network capacity. Most communications technologies use packet switching to increase network efficiency, compared to circuit switching. There are protocols, such as Transmission Control Protocol (TCP), that provides reliable, ordered, and error-checked delivery of a stream of packets between end points of the communication. However, a communication technology, using such a protocol with one or more intermediate nodes that are configured to buffer packets before forwarding them, has a risk to reduce throughput because a lost packet is detected later and for retransmitting one may need to wait a little bit longer.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION OF SOME EMBODIMENTS

Figure 1:
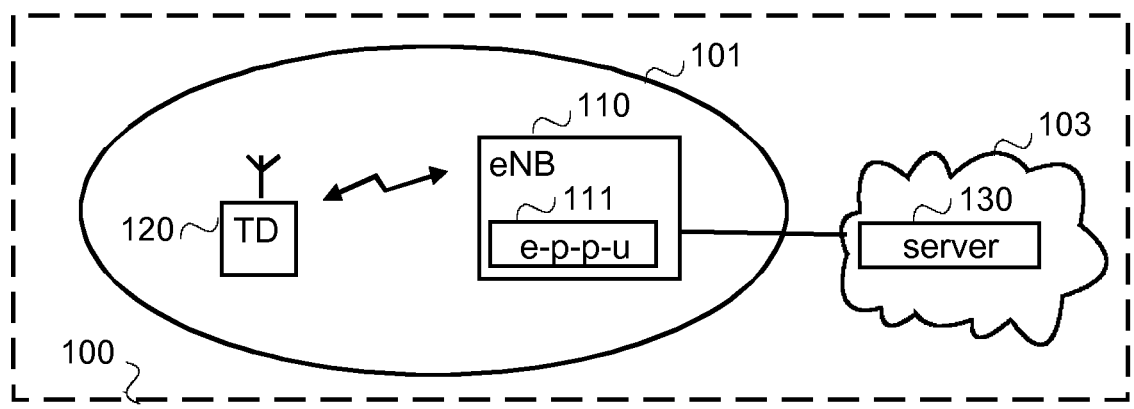
FIG. 1 illustrates an exemplified wireless communication system.

The following embodiments are exemplifying. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system, wired or wireless, that are configured to use prioritizing in transmission scheduling, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, LTE-Advanced Pro, fifth generation (5G) system, beyond 5G, and/or wireless local area networks (WLAN) based on IEEE 802.11 specifications on IEEE 802.15 specifications. The embodiments are not, however, restricted to the systems given as an example but a person skilled in the art may apply the solution to other communication systems provided with necessary properties. One example of a suitable communications system is the 5G system, as listed above.

5G has been envisaged to use multiple-input-multiple-output (MIMO) multi-antenna transmission techniques, more base stations or access nodes than the current network deployments of LTE, by using a so-called small cell concept including macro sites operating in co-operation with smaller local area access nodes, such as local ultra-dense deployment of small cells, and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed. For example, one or more of the below described network node functionalities may be migrated to any corresponding abstraction or apparatus or device. Therefore, all words and expressions should be interpreted broadly and they are intended to illustrate, not to restrict, the embodiment.

An extremely general architecture of an exemplifying system 100 to which embodiments of the invention may be applied is illustrated in FIG. 1. FIG. 1 is a simplified system architecture only showing some elements and functional entities, all being logical units whose implementation may differ from what is shown. It is apparent to a person skilled in the art that the system may comprise any number of the illustrated elements and functional entities.

Referring to FIG. 1, a cellular communication system 100, formed by one or more cellular radio communication networks, such as the Long Term Evolution (LTE), the LTE-Advanced (LTE-A) of the 3rd Generation Partnership Project (3GPP), or the predicted future 5G solutions, are typically composed of one or more network nodes that may be of different type. An example of such network nodes is a base station 110, such as an evolved NodeB (eNB), providing a wide area, medium range or local area coverage 101 for terminal devices 120, for example for the terminal devices to obtain wireless access to servers 130 in other networks 103 such as the Internet, either directly or via a core network (not illustrated in FIG. 1). In order to optimize the cell and system capacity and the end user experience, the base station is configured to prioritize data streams differently when scheduling transmissions. Further, in the illustrated example the base station 110 is configured to monitor packet loss rates and, if a need is detected temporarily elevate a priority. For that purpose the base station 110 comprises an enhanced packet processing unit (e-p-p-u) 111. Examples of different functionalities of the enhanced packet processing unit 111 will be described in more detail below.

In general a base station 110 may be any network node (device, apparatus) capable of acting as an intermediate node that uses different priorities when scheduling transmissions of packets belonging to different streams. Any such network node may be provided with an enhanced packet processing unit.

The terminal device (TD) 120 refers to a portable computing device (equipment, apparatus), and it may also be referred to as a user device, a user terminal or a mobile terminal or a machine-type-communication (MTC) device, also called Machine-to-Machine device and peer-to-peer device. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), handset, laptop and/or touch screen computer, e-reading device, tablet, game console, notebook, multimedia device, sensor, actuator, video camera, car, refrigerator, other domestic appliances, telemetry appliances, and telemonitoring appliances.

The server 130 depicts here a source wherefrom information is sent to the terminal device, and a target whereto information may be sent from the terminal device. The server 130, such as a file server or a web server, is used as an example of the source since the amount of data transferred from the server to terminal devices may be quite big.

Figure 2:
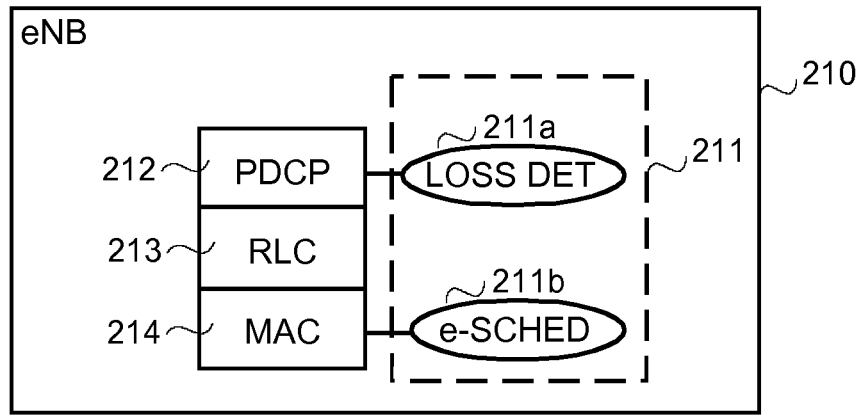
FIG. 2 illustrates an exemplified architecture of n network node.

FIG. 2 illustrates an exemplified user plane architecture of a network node, or more precisely, a base station 210, that comprises an enhanced packet processing unit configured especially for data streams over an air interface.

The base station 210 is configured to implement above a physical layer 1 (not illustrated) a layer 2 (L2) radio protocol stack comprising following three sub-layers: a packet data convergence protocol (PDCP) layer 212, a radio link controller (RLC) layer 213 and a media access control (MAC) layer 214. PDCP layer 212 processes IP (Internet protocol) packets in user plane, for example. RLC layer 213 adapts packets to a size suitable for radio interface, for example. MAC layer performs actual scheduling of transmissions, based on negotiated Quality of Service, for example.

To provide the enhanced packet processing unit 211, in the illustrated example there is on the PDCP layer level a packet loss detector (LOSS DET) 211a and on the MAC layer level an enhanced MAC scheduler (e-SCHED) 211b. The enhanced MAC scheduler 211b is based on a MAC scheduler that is responsible for scheduling the cell's radio resources used in the downlink and uplink whilst providing the required Quality of Service to data streams, the enhancement upgrading the MAC scheduler to co-operate with the packet loss detector 211a, as will be described in more detail below, especially with FIGS. 6 to 8.

It should be appreciated that FIG. 2 provides only an example and any other user plane architecture may be used, and the functionality of the packet loss detector and/or the enhanced MAC scheduler may be implemented in any layer, as long as a corresponding functionality is provided.

Figure 3:
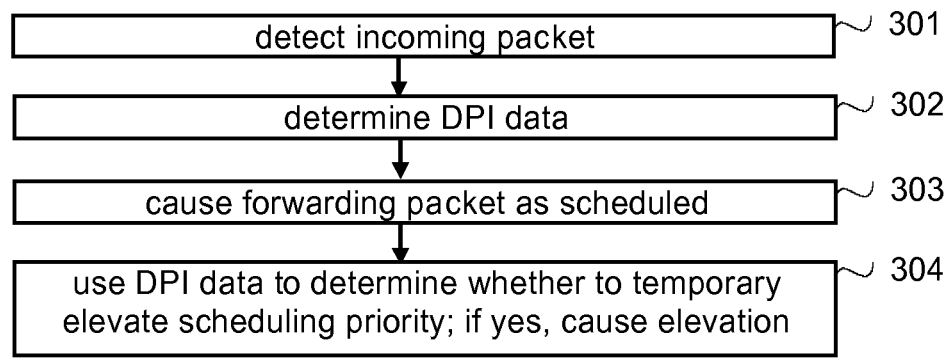
FIGS. 3 to 10 illustrate exemplified processes.

FIG. 3 is a flow chart illustrating an exemplified functionality of an intermediate node, or more precisely, the enhanced packet processing unit in the intermediate node.

Figure 5:
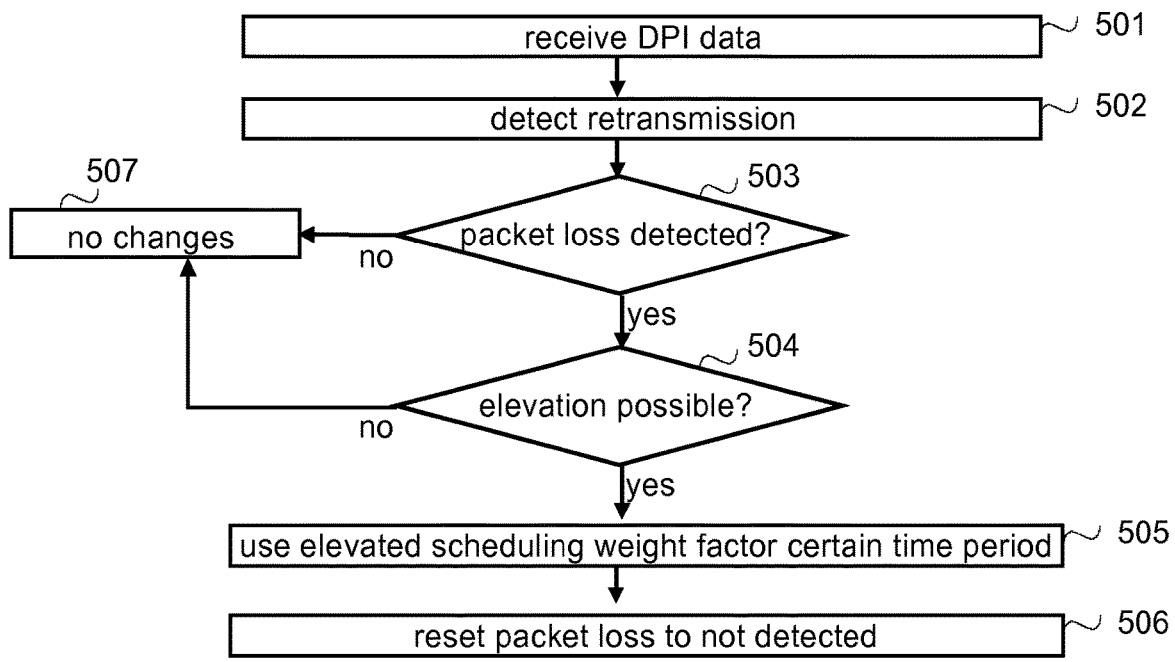
Figure 6:
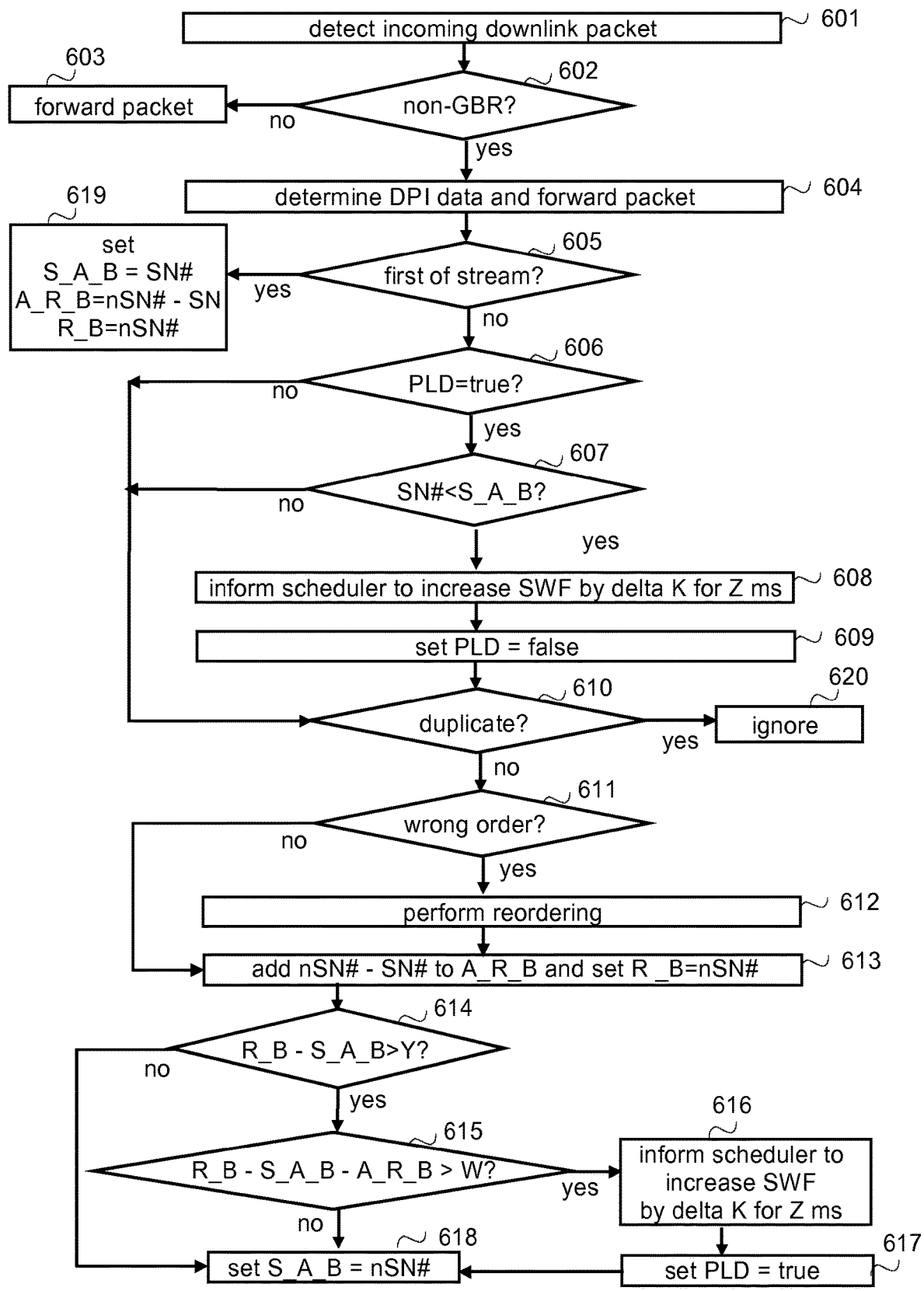

Referring to FIG. 3, when an incoming packet is detected in block 301, a predefined information elements are determined, or extracted from the packet in block 302. The information elements preferably indicate a stream the packet belongs to and information based on which packet loss may be determined, such as information indicating the packet's order in the stream. For example, if the packet is a packet sent using TCP/IP, data in TCP header fields "sequence number", "next sequence number" and "destination port" is determined. The information may be obtained by using any deep packet inspection (DPI) algorithm, for example. An example of such an algorithm is an advanced packet filtering that is configured to search, verify, sort and reroute packets containing specified information. Therefore herein data in the predefined information elements is called as deep packet inspection (DPI) data. Once the DPI data is determined/extracted, forwarding the packet as scheduled is caused in block 303. In other words, user plane data handling is performed to the packet in a same way as if no DPI data has been determined. While the packet undergoes the user plane data handling, the determined DPI data is used in block 304 for determining whether or not to temporary increase a scheduling priority of the stream the packet belongs to, and if a need is detected temporarily elevation of the priority is caused in block 304. For example, if the sequence numbers, or the order indicate that certain amount of packets have been lost, the priority will be elevated. Different examples are illustrated in FIGS. 4 to 6.

An advantage of the solution is that it does not affect to acknowledgement process; the end receiver will receive the packets and will acknowledge (or send negative acknowledgement) the packet as usual, but in case of packet losses the procedure is speeded up since the elevation of priority causes that retransmissions of lost packets will be received earlier, thanks to the elevated priority. Further, since the intermediate node is not itself involved for the actual user plane traffic, implementation is rather straightforward one and end processes are not affected. For example, thinking of a cellular network and a handover, a base station (evolved Node B) elevating scheduling priority does not decrease performance, but may even increase performance during the handover.

Figure 4:
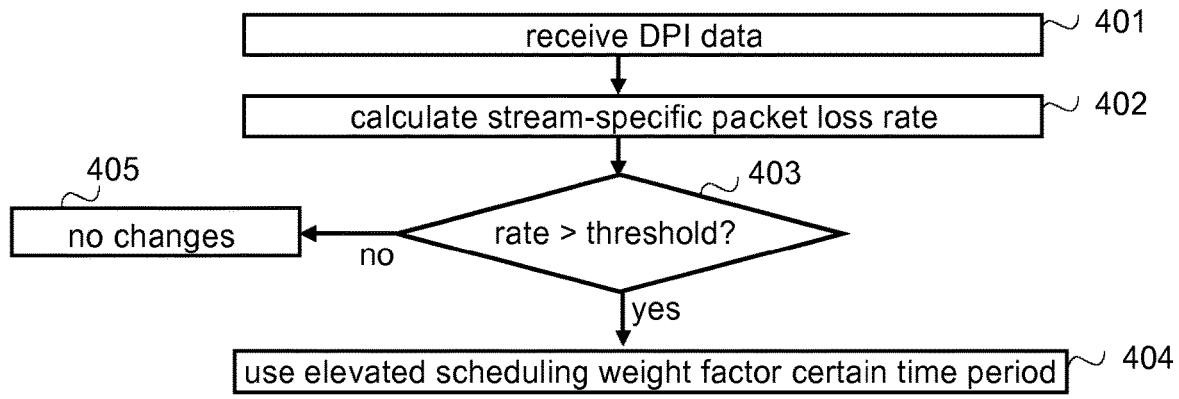

FIG. 4 is a flow chart illustrating an exemplified functionality of an intermediate node, or more precisely, the enhanced packet processing unit in the intermediate node.

Referring to FIG. 4, when the enhanced packet processing unit, or the packet loss detector of the enhanced packet processing unit receives (or determines) DPI data in block 401, it uses the received DPI data with previously received DPI data, to calculate stream-specific packet loss rate in block 402. In other words, packet loss rate is calculated for each stream separately. Then the packet loss rate is compared in block 403 with a predefined threshold for packet losses. The threshold may be same for all streams, or the threshold may depend on the intended quality of service (QoS) of the stream.

If the packet loss rate exceeds the threshold (block 403: yes) use of an elevated scheduling weight factor for a certain time period is caused in block 404. In other words, the scheduling priority is elevated.

If the packet loss rate remains below the threshold (block 403: no), no changes are caused in block 405. In other words, the scheduling priority is not elevated (or decreased).

FIG. 5 is a flow chart illustrating another exemplified functionality of an intermediate node, or more precisely, the enhanced packet processing unit in the intermediate node, in which functionality retransmission are used as a decisive factor.

Referring to FIG. 5, when the enhanced packet processing unit, or the packet loss detector of the enhanced packet processing unit receives (or determines) DPI data in block 501, it analyzes (not specifically shown) stream-specifically the received DPI data with previously received DPI data. In the illustrated example, a retransmission of a packet is detected in block 502. Then it is checked in block 503 whether or not a packet loss has been detected earlier. If yes, in the illustrated example it is checked in block 504, whether or not the elevation is possible. The checking may include plurality of phases. For example, a scheduling priority of the stream may be determined, and if the scheduling priority is already the highest one, no elevation of the scheduling priority is possible. Another example includes an upper limit for the number of streams that may be elevated at the same time; and if already the upper limit has been reached, no elevation of the scheduling priority is possible. A further rule may be that irrespective of the upper limit, if the stream itself is one of the stream having elevated scheduling priority, the elevation is deemed to be possible, but it may be that only the time for elevated scheduling priority is extended.

If the elevation is deemed to be possible (block 504: yes), use of an elevated scheduling weight factor for a certain time period is caused in block 505. In other words, the scheduling priority is elevated. The intention of the elevation is to receive an acknowledgement to the retransmitted packet earlier, and hence to achieve balance to the packet transmission, as soon as possible. Then, in the example, the packet loss status is reset in block 506 to be not detected.

If packet loss has not been detected earlier (i.e. the status is not detected) (block 503: no), or if the elevation is not possible (block 504: no) no changes are caused in block 507. In other words, the scheduling priority is not elevated (or decreased).

It should be appreciated that the check, whether or not elevation is possible, may be omitted, and the process may continue, if packet loss has been detected earlier directly (block 503: yes) directly to cause (block 505) use of the elevated scheduling weight factor for a certain time period.

FIG. 6 illustrates a further example of an implementation. The implementation in FIG. 6 is for downlink functionality of a base station, and blocks 605 onwards described functionality of an enhanced packet processing unit illustrated with FIG. 2, and more specifically its packet loss detector. A further assumption made with FIG. 6 is that the process is performed only to streams having bearers that have non-guaranteed bit rate (non-GBR bearers). In other words, scheduling priority will not be elevated for streams having a guaranteed bit rate. Applying the below to streams with GBR bearers is a straightforward process to one skilled in the art: just to skip over block 602 in which the bearer type is checked. Naturally, if the stream has the highest priority, it cannot be elevated, as is described above.

Figure 7:
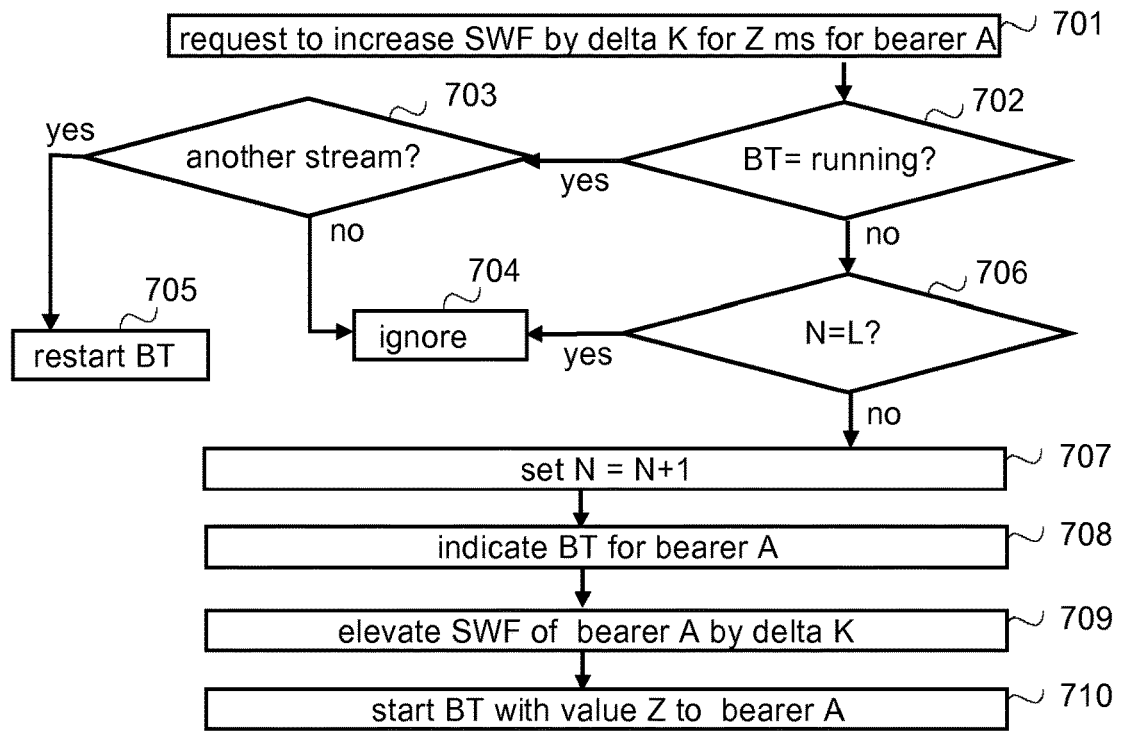
Figure 8:
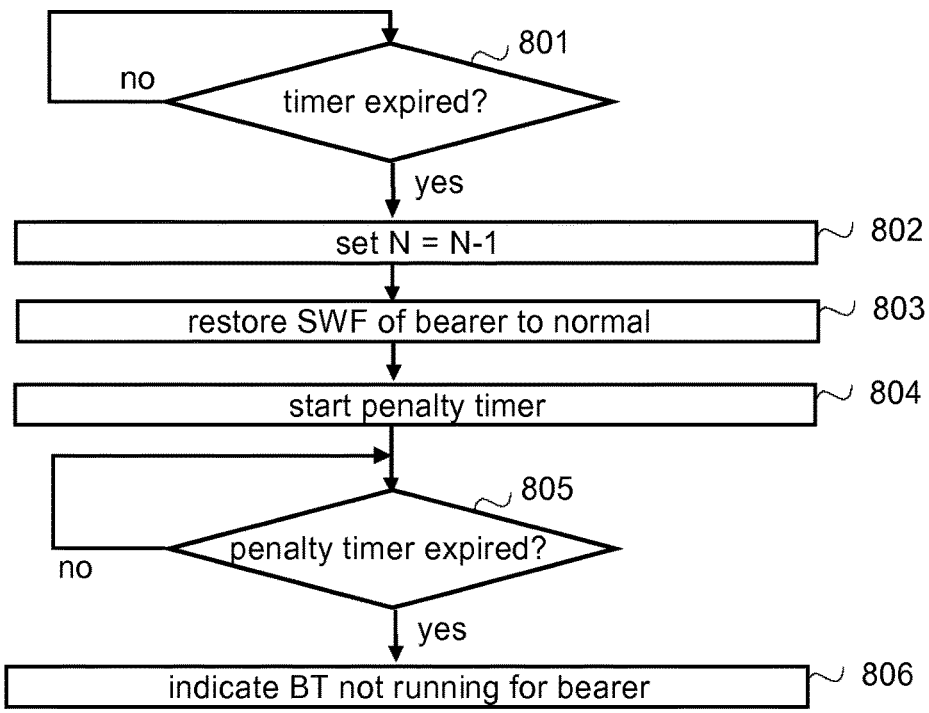

In the example illustrated in FIGS. 6 to 8, parameters delta K and/or Z may have an updatable predefined value, or values amongst which the process selects according to one or more rules. The same applies to other parameters as well.

Delta K indicates how much the scheduling weight factor of stream's quality of service class identifier (QCI) is elevated. QCI is a mechanism to ensure proper Quality of Service for bearer traffic. Delta K may be any value, but preferably it is 1, 2 or 3 in order to ensure proper functioning of the network. The value of the delta K, or in case a default value is used first, the default value, may depend on QCI of the stream. An upper limit for the value of delta K may be set. The upper limit may be the same as the maximum value of the scheduling weight factor.

Z indicates the time how long the scheduling weight factor is elevated. Z also may be any time, such as 100 ms, 200 ms, 300 ms, 400 ms, or 500 ms. The value of Z, or in case a default value is used first, the default value, may depend on QCI of the stream. Further, the value of Z may change according to the number of elevated streams/bearers. In addition, the amount of data buffered in the base station may affect to the value of Z.

Naturally, since several streams are processed concurrently, the process should take care that if simultaneously two different streams with two different channel quality indicators are elevated, the priority between the streams preferably remains the same after the elevation.

Even though in the example the values of delta K and Z are transmitted to the enhanced MAC scheduler, it should be appreciated that it suffices just to inform the enhanced MAC scheduler on the elevation, or send only one of delta K and Z. For example, the enhanced MAC scheduler may comprise the values as preset or be configured to use an algorithm that calculates how much to elevate, and/or for how long.

Referring to FIG. 6, once an incoming downlink packet is detected in block 601, it is checked in block 602, whether its bearer is a non-GBR bearer. If not (block 602: no), i.e. if the bearer is a GBR bearer, forwarding the packet as scheduled is caused in block 603.

If the bearer is a non-GBR bearer (block 602: yes), its TCP/IP header fields are checked to determine in block 604 "Sequence number", "Next sequence number" and "Destination Port" and then forwarding the packet as scheduled is caused in block 604.

The destination port is used to identify the stream, and in block 605 it is checked whether a new stream has been started, i.e. whether the packet is the first packet in the stream.

If the packet is not the first packet (block 605: no), it is checked in block 606, whether a packet loss detected (PLD) parameter is set to be true. If yes, it is checked in block 607, whether the sequence number (SN #) determined in block 604 is smaller than a value of a variable called a start analysis byte (S_A_B). If it is, a retransmission is detected, and informing the updated MAC scheduler, or any corresponding functionality/unit, to increase (elevate) the stream's scheduling weight factor (SWF) by a delta K for Z milliseconds is caused in block 608. This takes into account the possibility that it may take some time before a retransmission is received, and it may be that the scheduling weight factor is not any more elevated when the retransmission is received. Thanks to this functionality the round trip time of the retransmission will be shorter.

Further, since the scheduling of the stream is elevated, the packet loss detected (PLD) parameter is set in block 609 to be false.

Then, or if the packet loss detected (PLD) parameter was not true (block 606: no), or if the sequence number was not smaller than the value of the start analysis byte (block 607: no), it is checked in block, using the sequence numbers, whether the packet was a duplicate.

If the packet was not a duplicate one, it is checked in block 611, whether the packet was received in a wrong order, and if yes, a reordering is performed in block 612. (Although description of FIG. 6 is for DPI data of one packet, DPI data of several packets is processed simultaneously.)

After reordering (block 612), or if the packet was received in a right order (block 611: no), two variable values are updated in block 613: a variable for total number of bytes received, i.e. actual received bytes (A_R_B), and received bytes (R_B). The variable actual received bytes (A_R_B) is incremented in block 613 by a difference between the next sequence number (nSN #) and sequence number (SN #) determined in block 604. The variable, received bytes (R_B) is set to be the next sequence number (nSN #).

Then it is checked in block 614, whether a difference between values of variables received bytes (R_B) and start analysis byte (S_A_B) exceeds a preset threshold Y. In other words, the threshold Y sets a size of a window used to detect packet loss (how many packets will be used for monitoring packet loss). Any value may be used for the threshold Y, an example of a value being 20 000 bytes. If the difference exceeds the threshold, it is checked in block 615, whether a further difference, a difference between a result, obtained by subtracting from the value of the received bytes (R_B) the value of the start analysis byte (S_A_B), and the value of the variable actual received bytes (A_R_B) exceeds a preset threshold W. Any value may be used for the threshold W, an example of a value being 1600 bytes. The threshold W defines how many packets have to be lost before an elevation is caused. With the threshold W it can be ensured that a loss of a single packet does not cause the elevation.

If the difference between the result (R_B−S_A_B) and the value of the variable actual received bytes (A_R_B) exceeds the threshold W (block 615: yes) informing the updated MAC scheduler, or any corresponding functionality/unit, to increase (elevate) the stream's scheduling weight factor (SWF) by a delta K for Z milliseconds is caused in block 616. Further since packet loss was detected to be over a threshold, the packet loss detected (PLD) variable is set in block 617 to be true. As a last step relating to the packet detected in block 601, the value of the variable start analysis byte (S_A_B) is set in block 618 to be the next sequence number (nSN #) determined in block 604.

If the difference between the result (R_B−S_A_B) and the value of the variable actual received bytes (A_R_B) does not exceed the threshold W (block 615: no), or if the difference between values of variables received bytes (R_B) and start analysis byte (S_A_B) does not exceed the preset threshold Y, the process proceeds directly to block 618 to set the value of the variable start analysis byte.

If the packet was the first of the stream (block 605: yes) the variable start analysis byte (S_A_B) is preliminary set in block 619 to be the sequence number (SN #) determined in block 604, the variable actual received bytes (A_R_B) is set in block 619 to be a difference between the next sequence number (nSN #) and sequence number (SN #) determined in block 604, and the variable received bytes (R_B) is set to be the next sequence number (nSN #).

If the packet was a duplicate (block 610: yes), it, or more precisely the data in the packet, is ignored in block 620, and the process for the data packet ends.

FIGS. 7 and 8 illustrate how the enhanced MAC scheduler may be updated to act along the functionality described above with FIG. 6. In the example it is assumed that there is an upper limit L for the number of bearers that may concurrently have elevated priority. Any number may be used for L. It may be 1, 2, 3 etc. If too many bearers are elevated, it causes decrease in data rate for users not facing packet loss. This side effect is limited with the upper limit L. Further, it is assumed that the elevation is performed bearer—specifically while a stream has an elevated scheduling for a bearer, a request to elevate the same bearer is ignored. However, it should be appreciated that other rules than those described herein may be used as well.

Referring to FIG. 7, upon receiving in block 701 a request to increase (elevate) scheduling weight factor (SWF) by a delta K for Z milliseconds for a bearer A for a stream A. It is checked in block 702, whether or not there already is a bearer-specific timer (BT) running for the bearer A. If it is, it is checked in block 703, whether the bearer-specific timer (BT) is running for the stream A, or for another stream. If the bearer-specific timer (BT) is running for the stream A, the request is ignored in block 704.

If the bearer-specific timer (BT) is running for another stream (block 703: yes), in the illustrated example, the bearer-specific timer (BT) is restarted/updated in block 705 so that it will run Z milliseconds from reception of the request. It should be appreciated that also other algorithms to update, such as restarting the timer with original value (if different from Z), adding to the remaining time Z or half of the Z, etc. may be used. Alternatively, if the bearer-specific timer is running a request may be ignored regardless the stream for which the request is performed.

If no bearer-specific timer is running for the bearer A (block 702: no), it is checked in block 706 whether the number (N) of bearers having elevated priority is the same as the upper limit (L) for bearers. If it is, the request is ignored in block 704.

If the number (N) of bearers having elevated priority is not the same as the upper limit (L) for bearers (block 706: no), the number of bearers having elevated priority is increased by one in block 707, and an indication that a bearer-specific timer (BT) is running for the bearer A is created in block 708. Further, the scheduling priority (scheduling weight factor) is elevated in block 709 by the delta K indicated in the request received in block 701. Naturally a timer for the bearer A (bearer-specific timer) is started in block 710 with value Z.

FIG. 8 illustrates an exemplary functionality how the process continues in the background once the bearer-specific timer is started. In the illustrated example, a so called penalty timer is also used, as will be explained in detail below. The penalty timer is a parameter whose value may be predefined, the value may be same for all streams or depend on the quality channel indicator of the stream that caused the bearer-specific timer to start (or restart when the bearer-specific timer is restarted). Referring to FIG. 8, once the timer (bearer-specific timer) has been started, it is waited in block 801 for the time period of Z the timer to expire. When the timer expires (block 801:yes), the number (N) of bearers having elevated priority is decreased in block 802 by one, and scheduling weight factor (SWF) is returned in block 803 to its normal value. A penalty timer is also started in block 804. When the penalty timer expires (block 805: yes), it is indicated in block 806 that the bearer-specific timer (BT) is not running for the bearer, for example by deleting the indication created in block 706.

It should be appreciated that, it is a straightforward process for one skilled in the art to implement the examples without the upper limit and/or penalty timer and/or without ignoring a request to elevate while a bearer has an elevated scheduling. Further, it is a straightforward process for one skilled in the art to implement the functionality described with FIGS. 7 and 8 to be stream-specific instead of bearer-specific.

There are different types of data transmissions: some involve a big amount of data, some small amount of data. The packet loss detection/determination functionality described above may be limited to data transmissions in which large amounts of data is transmitted, since such transmissions most probably suffer from packet loss.

Figure 9:
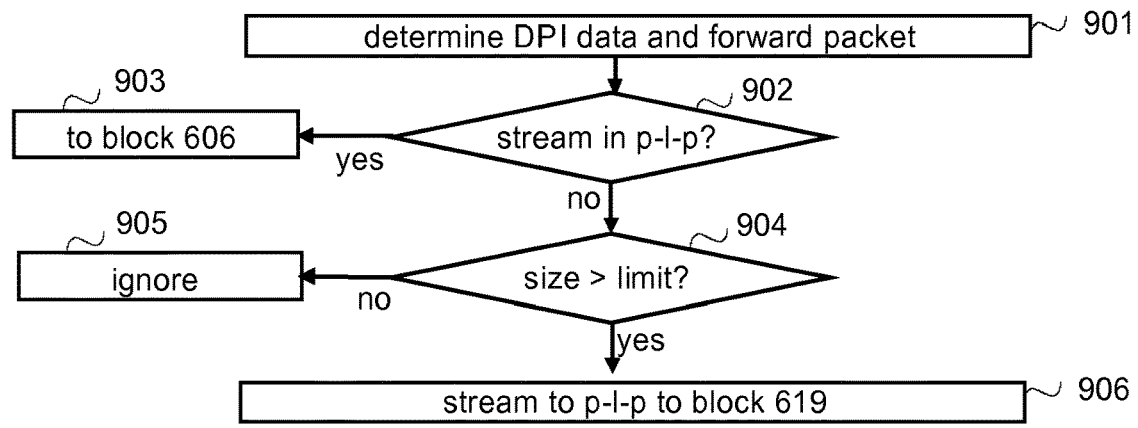

FIG. 9 illustrates an implementation in which the enhanced packet processing unit, or the packet loss detector, is configured to determine, based on size, whether or not to put the stream to the packet loss process/functionality described above with FIG. 6. Naturally corresponding selection of streams can be implemented with other packet loss processes/functionalities.

Referring to FIG. 9, it starts on what corresponds block 604 in FIG. 6: packets DPI data, i.e. its TCP/IP header fields are checked to determine in block 901 "Sequence number", "Next sequence number" and "Destination Port" and then forwarding the packet as scheduled is caused in block 901.

Then it is determined in block 902 whether or not the packet belongs to a stream who is already undergoing packet loss process (p-l-p). If it is, the process continues in block 903 to block 606 in FIG. 6 (to check whether packet loss has been detected).

If the stream is not yet undergoing packet loss process (block 902:no), it is checked in block 904, whether the size of the packet is bigger than a preset limit (threshold) for a size. If not, the previously obtained data is ignored in block 905. In other words, streams having small packets will not undergo the packet loss process.

If the size of the packet is bigger than the limit (block 904:yes), the stream is put in block 906 into the packet loss process, more precisely to block 619 to set variable values using the information determined in block 901.

Basically the functionality of FIG. 9 may replace block 605 in FIG. 6, or complement block 605 in FIG. 6.

Figure 10:
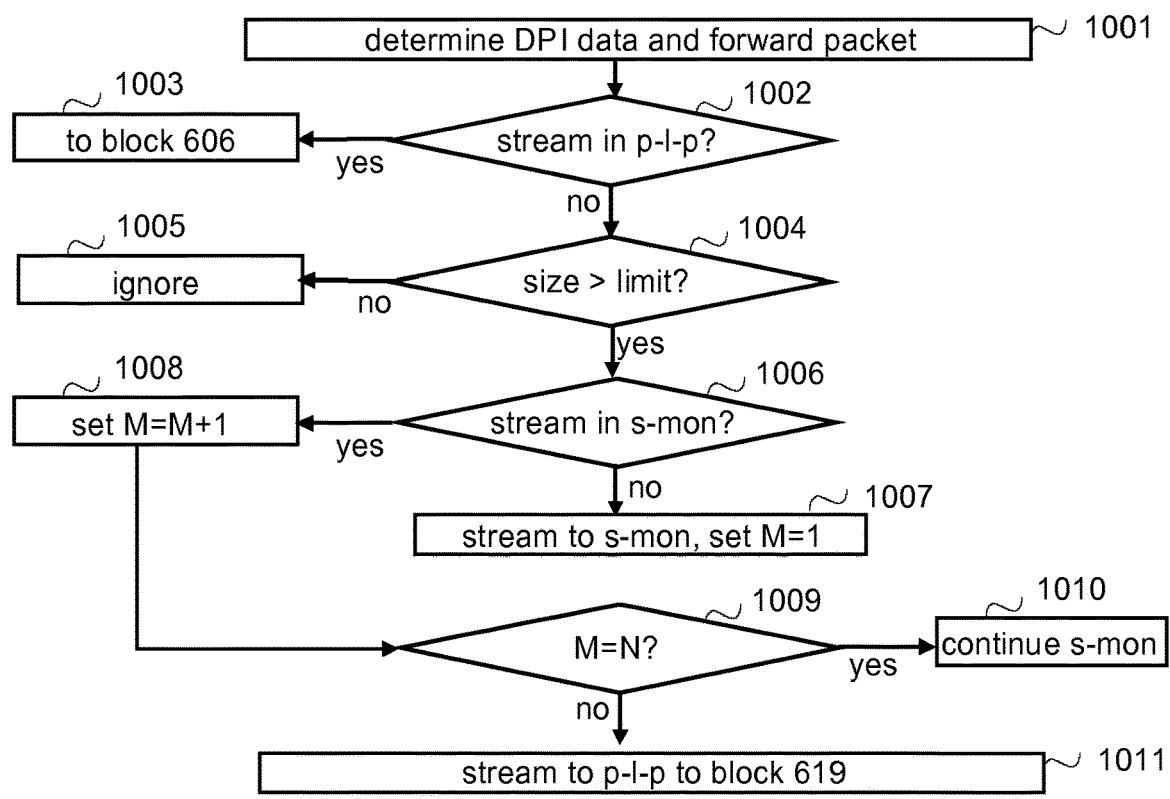

However, since streams may have variable size of packets, the process described above with FIG. 9 may be fine-tuned for taking that into account. FIG. 10 illustrates an example of such a fine-tuned process, called with FIG. 10 stream monitoring.

Referring to FIG. 10, blocks 1001 to 1005 are the same as blocks 901 to 905, and they are not repeated in vain herein. However, if the size of the packet is bigger than the limit (block 1004:yes), it is checked in block 1006, whether or not the stream is already in the stream monitoring process (s-mon). If not, the stream is put in block 1007 to stream monitoring process and a variable M is set in block 1007 to be one.

If the stream is already in the stream monitoring process (block 1006: yes), variable M is incremented by one in block 1008. Then it is checked in block 1009, whether or not variable M equals to N which is the limit for entering the packet loss process. N may be any value. For example, if N=4 it indicates that if four packet exceeding the size limit have been received, the stream most probably relates to data transmission over which big amount of data is transmitted, and hence most probably packet loss may occur.

If M does not equal to N (block 1009), the stream monitoring is continued in block 1010. If M equals to N (block 1009), the stream monitoring is ended and the stream is put in block 1011 into the packet loss process, to block 619 in FIG. 6.

Instead of comparing in block 1009, whether N packets that exceed the size limit is received, one may compare whether N successive packets that exceed the size limit is received. A further criteria may be that the packets have to be received within a predetermined time. It should be appreciated that various combinations to create criteria to enter the packet loss process may be defined.

It should be appreciated that the functionality described above with FIG. 9 or FIG. 10 may be combined with a functionality described above with any of FIGS. 3, 4 and 5. For example, the functionality may be introduced before block 304 in FIG. 3, and/or between blocks 401 and 402 in FIG. 4, and/or between blocks 501 and 502 in FIG. 5.

The blocks, related functions, and information exchanges described above by means of FIGS. 3 to 10 are in no absolute chronological order, and some of them may be performed simultaneously or in an order differing from the given one. Naturally similar processes for several packets/streams may run in parallel. Other functions can also be executed between them or within them, and other information may be sent. Some of the blocks or part of the blocks or one or more pieces of information can also be left out or replaced by a corresponding block or part of the block or one or more pieces of information. For example, checking the duplicates (block 610) and/or order (block 611) and reordering (block 612) may be omitted.

The techniques and methods described herein may be implemented by various means so that an apparatus/base station/intermediate node/access node configured to support deep packet inspection and temporary elevation of priority based on at least partly on what is disclosed above with any of FIGS. 1 to 10, including implementing one or more functions/operations of a corresponding terminal device described above with an embodiment/example, for example by means of any of FIGS. 2 to 10, comprises not only prior art means, but also means for implementing the one or more functions/operations of a corresponding functionality described with an embodiment, for example by means of any of FIGS. 2 to 10, and it may comprise separate means for each separate function/operation, or means may be configured to perform two or more functions/operations. For example, one or more of the means and/or the enhanced packet processing unit, or its sub-units, described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 1 to 10, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 11:
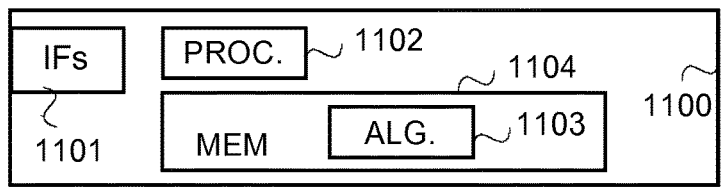
FIG. 11 is a schematic block diagram.

FIG. 11 provides an apparatus according to some embodiments of the invention. FIG. 11 illustrates an apparatus configured to carry out the functions described above in connection with the terminal device. Each apparatus may comprise one or more communication control circuitry, such as at least one processor 1102, and at least one memory 1104, including one or more algorithms 1103, such as a computer program code (software) wherein the at least one memory and the computer program code (software) are configured, with the at least one processor, to cause the apparatus to carry out any one of the exemplified functionalities of the terminal device.

The memory 1104 may be implemented using any suitable data storage technology, such as semiconductor based memory devices, flash memory, magnetic memory devices and systems, optical memory devices and systems, fixed memory and removable memory. The memory may comprise a configuration database for storing transmission time interval configuration data, as described above, for example with FIG. 1.

The apparatus may further comprise different interfaces 1101, such as one or more communication interfaces (TX/RX) comprising hardware and/or software for realizing communication connectivity according to one or more communication protocols. The communication interface may provide the apparatus with communication capabilities to communicate in the cellular communication system and enable communication between different network nodes and between the terminal device and the different network nodes, for example. The communication interface may comprise standard well-known components such as an amplifier, filter, frequency-converter, (de)modulator, and encoder/decoder circuitries and one or more antennas. The communication interfaces may comprise radio interface components providing the network node and the terminal device with radio communication capability in the cell.

Referring to FIG. 11, at least one of the communication control circuitries in the apparatus 1100 is configured to provide the enhanced packet processing unit, or one or more of its sub-units, and to carry out functionalities described above by means of any of FIGS. 3 to 10 by one or more circuitries.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, the at least one processor, the memory, and the computer program code form processing means or comprises one or more computer program code portions for carrying out one or more operations according to any one of the embodiments of FIGS. 3 to 10 or operations thereof.

Embodiments as described may also be carried out in the form of a computer process defined by a computer program or portions thereof. Embodiments of the methods described in connection with FIGS. 3 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   detecting at an intermediate network node an incoming packet;
   determining deep packet inspection data from the packet;
   using the deep packet inspection data to determine whether to temporary elevate scheduling priority of the stream the packet belongs to; and
   causing, in response to determining to elevate scheduling priority of the stream, a temporary elevation of the scheduling priority of the stream.

2. A method as claimed in claim 1, further comprising:
calculating, by using the deep packet inspection data, a packet loss rate of the stream;
comparing the packet loss rate with a preset threshold; and determining, in response to the packet loss rate exceeding the threshold, to elevate the scheduling priority of the stream.

3. A method as claimed in claim 1, further comprising:
indicating, in response to the determining to elevate scheduling priority of the stream, that packet loss have been detected for the stream.

4. A method as claimed in claim 3, further comprising:
detecting from the deep packet inspection data that the packet is a retransmission;
checking whether packet loss have been detected for the stream;
if packet loss have been detected for the stream, causing a temporary elevation of the scheduling priority of the stream, and indicating that no packet loss have been detected for the stream.

5. A method as claimed in claim 1, further comprising:
checking, before elevating the scheduling priority, whether the stream already has a temporarily elevated scheduling priority;
if not, checking whether the number of streams having elevated scheduling priority is the same as a preset upper limit; and
if the number of streams having elevated scheduling priority is smaller than the preset upper limit, elevating the scheduling priority of the stream.

6. A method as claimed in claim 5, further comprising indicating the stream as a temporarily elevated stream a preset time after the temporary elevation of the scheduling priority of the stream ends.

7. A method as claimed in claim 1, further comprising:
checking, before elevating the scheduling priority, whether the stream already has the highest scheduling priority; and
if the priority is not the highest one, causing a temporary elevation of the scheduling priority of the stream.

8. A method as claimed in claim 1, wherein the time the scheduling priority is elevated and/or the amount it is elevated depends on the quality of class identifier of the stream.

9. A method as claimed in claim 1, further comprising:
checking prior to the deep packet inspections, whether the stream has a non-guaranteed bit rate; and
performing the deep packet inspection in response to the stream having a non-guaranteed bit rate.

10. A method as claimed in claim 1, further comprising:
checking, before elevating the scheduling priority, whether a bearer for the stream already has a temporarily elevated scheduling priority;
if not, checking whether the number of bearers having elevated scheduling priority is the same as a preset upper limit; and
if the number of bearers having elevated scheduling priority is smaller than the preset upper limit, elevating the scheduling priority of the bearer.

11. A method as claimed in claim 10, further comprising:
if the bearer already has a temporarily elevated scheduling priority, checking, whether the scheduling priority has been elevated by the same stream;
if not, extending the time the scheduling priority is temporarily elevated.

12. A method as claimed in claim 10, further comprising indicating the bearer as being temporarily elevated a preset time after the temporary elevation of the scheduling priority of the bearer ends.

13. A method as claimed in claim 1, wherein the determining whether to elevate scheduling priority is performed at a PDCP layer, and the scheduling priority is elevated by elevating a scheduling weight factor in a MAC scheduler.

14. A method as claimed in claim 11, further comprising sending information on how long the scheduling priority is temporary elevated and/or the amount it is elevated from the PDCP layer to the MAC scheduler.

15. A method as claimed in claim 1, further comprising:
indicating streams in which the deep packet inspection data is used to determine whether to temporary elevate scheduling priority of the stream the packet belongs to;
checking from the incoming packet whether it belongs to an indicated stream;
using, in response to the incoming packet belonging to an indicated stream, the deep packet inspection data to determine whether to temporary elevate scheduling priority of the stream the packet belongs to;
performing, in response to the incoming packet not belonging to an indicated stream, following:
using the deep packet inspection data to determine a size of the packet;
determining, based at least on the size of the packet, whether the stream has big enough packets according to one or more preset rules including that the size of the packet exceeds a threshold, a preset number of packets belonging to the stream have a size that exceeds the threshold, and within a certain time period a preset number of packets belonging to the stream have a size that exceeds the threshold; and
indicating, in response to the stream of the packet being determined having big enough packets, the stream to be a stream in which the deep packet inspection data is used to determine whether to temporary elevate scheduling priority of the stream the packet belongs to.

16. A network node comprising:
at least one processor, and
at least one non-transitory memory comprising a computer program code, wherein the processor, the memory, and the computer program code are configured to cause the network node to:
determine deep packet inspection data from an incoming packet;
use the deep packet inspection data to determine whether to temporary elevate scheduling priority of the stream the packet belongs to; and
cause, in response to determining to elevate scheduling priority of the stream, a temporary elevation of the scheduling priority of the stream.

17. A network node as claimed in claim 16, wherein the processor, the memory, and the computer program code are further configured to cause the network node to:
calculate, using the deep packet inspection data, a packet loss rate of the stream;
compare the packet loss rate with a preset threshold; and
elevate, in response to the packet loss rate exceeding the threshold, the scheduling priority of the stream.

18. A network node as claimed in claim 16, wherein the processor, the memory, and the computer program code are further configured to cause the network node to:
indicate, in response to elevation of the scheduling priority of the stream caused by a detected packet loss, that packet loss have been detected for the stream;

check, in response to detecting from the deep packet inspection data that the packet is a retransmission, whether packet loss have been detected for the stream;
cause, in response to the packet loss have been detected for the stream, a temporary elevation of the scheduling priority of the stream, and indicate that no packet loss have been detected for the stream.

19. A network node as claimed in claim 16, wherein the processor, the memory, and the computer program code are further configured to cause the network node to:
check prior to the deep packet inspections, whether the stream has a non-guaranteed bit rate; and
perform the deep packet inspection in response to the stream having a non-guaranteed bit rate; and
determine whether to elevate scheduling priority at a PDCP layer, and to elevate the scheduling priority by elevating a scheduling weight factor in a MAC scheduler; and
perform the elevation bearer-specifically; and
indicate streams in which the deep packet inspection data is used to determine whether to temporary elevate scheduling priority of the stream the packet belongs to;
check from the incoming packet whether it belongs to an indicated stream;
in response to the incoming packet not belonging to an indicated stream, the memory, and the computer program code are further configured to cause the network node to:
use the deep packet inspection data to determine a size of the packet; determine, based on the size of the packet, whether the stream has big enough packets according to one or more preset rules including that the size of the packet exceeds a threshold, a preset number of packets belonging to the stream have a size that exceeds the threshold, and within a certain time period a preset number of packets belonging to the stream have a size that exceeds the threshold; and
indicate, in response to the stream of the packet having big enough packets, the stream to be a stream in which the deep packet inspection data is used to determine whether to temporary elevate scheduling priority of the stream the packet belongs to.

20. A non-transitory computer readable media having stored thereon instructions that, when executed by a computing device, cause the computing device to:
determine from an incoming packet deep packet inspection data from the packet;
use the deep packet inspection data to determine whether to temporary elevate scheduling priority of the stream the packet belongs to; and
temporary elevate, in response to determining to elevate scheduling priority of the stream, the scheduling priority of the stream.

\* \* \* \* \*